(12) United States Patent
Erb

(10) Patent No.: US 7,307,494 B2
(45) Date of Patent: Dec. 11, 2007

(54) MULTI-BRANCH ANTENNA SIGNAL SEPARATING DEVICE

(75) Inventor: Jean-Luc Erb, Horbourg-Wihr (FR)

(73) Assignee: TDK Corporation, Tokyo (JP)

( * ) Notice: Subject to any disclaimer, the term of this patent is extended or adjusted under 35 U.S.C. 154(b) by 42 days.

(21) Appl. No.: 11/090,709

(22) Filed: Mar. 25, 2005

(65) Prior Publication Data

US 2005/0219010 A1  Oct. 6, 2005

(30) Foreign Application Priority Data

Mar. 30, 2004  (EP) ................................ 04007634

(51) Int. Cl.
*H01P 5/12*  (2006.01)
*H03H 7/38*  (2006.01)

(52) U.S. Cl. ................ 333/126; 333/129; 333/132

(58) Field of Classification Search ................ 333/126, 333/129, 132, 32, 33
See application file for complete search history.

(56) References Cited

U.S. PATENT DOCUMENTS 6,937,113 B2 *  8/2005  Ohashi et al. .............. 333/133

6,982,612 B2 *  1/2006  Sakano ........................ 333/133

FOREIGN PATENT DOCUMENTS

EP    0 871 288    10/1998
EP    0 872 953    10/1998

* cited by examiner

*Primary Examiner*—Robert Pascal
*Assistant Examiner*—Kimberly E Glenn
(74) *Attorney, Agent, or Firm*—Darby & Darby

(57) ABSTRACT

One aspect of the invention provides a signal separating device comprising a first and a second circuit branch connected to an antenna port, the first circuit branch comprising a filter for passing signals in a first frequency band, and the second circuit branch comprising a filter for passing signals in a second frequency band. The first and second circuit branches being arranged so that a respective reactive impedance is presented to the antenna port in both said first and said second frequency bands. The device further comprises an impedance matching circuit at the antenna port arranged to substantially to cancel out the respective reactive impedances. In the preferred embodiment, each circuit branch presents a respective shunt capacitance to the antenna port when out-of-band and the matching circuit comprises a shunt inductor at the antenna port.

9 Claims, 2 Drawing Sheets

MULTI-BRANCH ANTENNA SIGNAL SEPARATING DEVICE

FIELD OF THE INVENTION

The present invention relates to signal separating devices. The invention relates particularly, but not exclusively, to a signal separating device for use at the antenna of a multi-band telecommunications device, for example a mobile (or cellular) telephone handset.

BACKGROUND TO THE INVENTION

A multiplexer is a multi-port frequency dependent device that may be used as a separator or combiner of signals falling in different frequency bands. The most common type of multiplexer is a three port device known as a diplexer.

In a multi-band telecommunications device, such as a mobile telephone handset, the respective transmit (TX) and receive (RX) circuitry for each operational frequency band usually share a common antenna. A diplexer circuit is typically used to electrically couple the respective transmit (TX) and receive (RX) circuitry to the antenna. The diplexer ensures that signals in a given frequency band are not directed to the circuitry for a different frequency band.

FIG. 1 shows a simplified block diagram of part of a conventional dual-band telecommunications device such as may be found in a mobile telephone handset. It is assumed that the device is intended for operation in two frequency bands A and B. Hence, the device includes respective TX/RX circuitry 2, 4 for bands A and B respectively, an antenna 6 and a conventional diplexer 8. The diplexer 8 comprises three ports P1, P2 and P3. P1 is connected to the antenna 6, P2 is connected to the TX/RX circuitry of band A and P3 is connected to the TX/RX circuitry of band B. The diplexer 8 comprises two circuit branches, a first between P1 and P2, and a second between P1 and P3. The first branch includes a filter (Filter A) for passing signals in frequency band A. The second branch includes a filter (Filter B) for passing signals in frequency band B. Each branch may also include one or more impedance matching components (not individually shown in FIG. 1) to provide in-band impedance matching.

The arrangement is such that, when a signal in frequency band A is received by antenna 6, Filter A allows the received signal to pass from P1 to P2 and thereby on to the band A TX/RX circuitry 2, while Filter B prevents the received signal from passing from P1 to P3. Similarly, when a signal in frequency band B is received by antenna 6, Filter B allows the received signal to pass from P1 to P3 and thereby on to the band B TX/RX circuitry 4, while Filter A prevents the received signal from passing from P1 to P2.

In the following description, the term "in-band" is intended to refer to the components or characteristics of a circuit or system that relate to the selected or active operational frequency band. The term "out-of-band" is intended to refer to the components or characteristics of a circuit or system that relate to an operational frequency band other than the selected or active operational frequency band. For example, in FIG. 1, when a signal is received in operational frequency band A, the diplexer branch between P1 and P2 may be said to be the in-band branch, whereas the branch between P1 and P3 may be said to be the out-of-band branch.

Ideally, the out-of-band branch of the diplexer 8 should present an open-circuit to the antenna port P1. In practice, however, the out-of-band branch often presents, to the antenna port P1, a finite capacitive or inductive impedance with a high reflection coefficient. The high reflection coefficient enables the out-of-band branch to perform the basic function of preventing the received signal from travelling along the out-of-band branch. However, the finite impedance is commonly relatively low and this is detrimental to the performance of the diplexer and to the device of which it is part (as measured for example, by voltage standing wave ration (VSWR) and insertion loss (IL)).

It would be desirable, therefore, to provide a diplexer, or multiplexer, with improved out-of-band impedance matching. In many applications, including mobile telecommunications, it is important to keep size to a minimum and it would therefore be desirable to provide improved out-of-band matching without adding significantly to the size of the diplexer circuit. It would also be desirable to provide a diplexer, or multiplexer, which provides D.C. decoupling and protection from Electrostatic Discharge (ESD).

SUMMARY OF THE INVENTION

Accordingly, a first aspect of the invention provides a signal separating device comprising a first and a second circuit branch connected to an antenna port, the first circuit branch comprising a filter for passing signals in a first frequency band, and the second circuit branch comprising a filter for passing signals in a second frequency band, the first and second circuit branches being arranged so that a respective reactive impedance is presented to the antenna port in both said first and said second frequency bands, wherein the device further comprises an impedance matching circuit provided at the antenna port and arranged substantially to cancel out said respective reactive impedances.

Preferably, the first and second-circuit branches are each arranged to -present a respective reactive impedance to the antenna port when out-of-band.

Preferably, the impedance matching circuit is connected between the antenna port and electrical ground.

Preferably, the respective reactive impedances presented to the antenna port comprise a respective capacitive impedance between the antenna port and electrical ground.

More preferably, the matching circuit provides a respective inductive impedance in the first and second frequency bands, the respective inductive impedance being substantially opposite to the respective capacitive impedance presented to the antenna port.

Further preferably, the impedance matching circuit comprises an inductor connected between the antenna port and electrical ground. This provides ESD protection at the antenna port.

In the preferred embodiment, when signals are received at the antenna port in said first frequency band, said inductor and the capacitive impedance presented to the antenna port in said first frequency band resonate together, and, when signals are received at the antenna port in said second frequency band, said inductor and the capacitive impedance presented to the antenna port in said second frequency band resonate together.

This may be achieved when the ratio of the capacitive impedance presented to the antenna port in said first frequency band to the capacitive impedance presented to the antenna port in said second frequency band is substantially equal to the square of the ratio of said first frequency band to said second frequency band.

In the preferred embodiment, the first and second circuit branches are provided between the antenna port and a second and third port respectively, and a respective series capacitor is provided at each of said second and third ports.

This provides DC decoupling from DC bias signals which may be used in the associated TX/RX circuitry. Preferably, at least one circuit branch includes a series capacitor at the antenna port in order to provide DC decoupling at the antenna port.

The invention is not limited to signal separating devices having two circuit branches (e.g. a diplexer) but may also provide signal separating devices having three or more circuit branches and three or more corresponding operational frequency bands.

A second aspect of the invention provides an antenna switch module, or equivalent device, comprising a signal separating device according to the first aspect of the invention.

Other advantageous aspects of the invention will become apparent to those ordinarily skilled in the art upon review of the following description of a specific embodiment of the invention.

BRIEF DESCRIPTION OF THE DRAWINGS

An embodiment of the invention is now described by way of example and with reference to the accompanying drawings in which.

DETAILED DESCRIPTION OF THE DRAWINGS

In the preferred embodiment presented hereinafter, the invention is described and illustrated in the context of a diplexer. It will be understood that the invention is not limited to diplexers and may alternatively be employing with triplexers, multiplexers, or similar signal separating devices.

Figure 1:
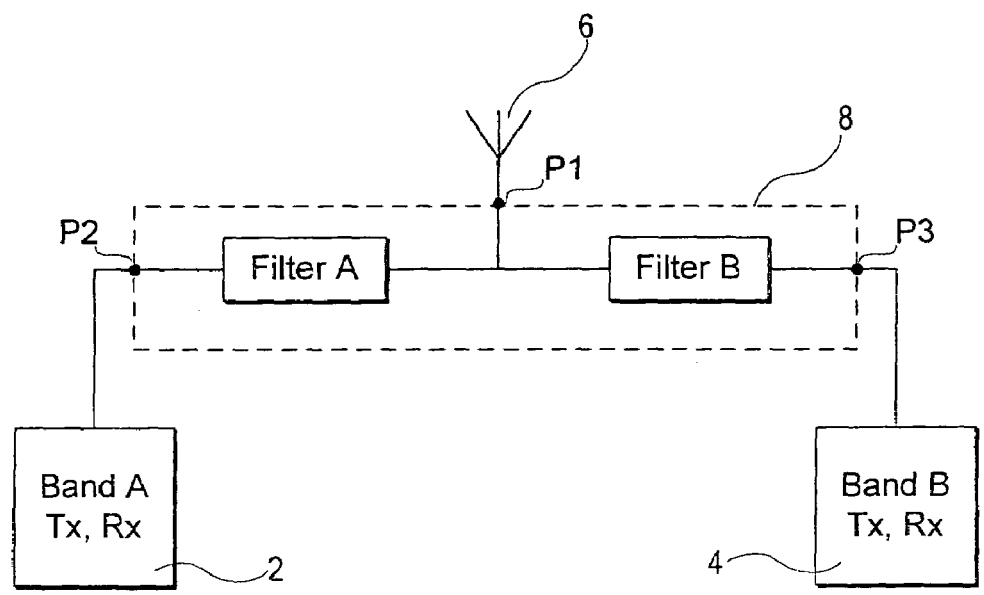
FIG. 1 is a block diagram of a conventional diplexer architecture.
Figure 2:
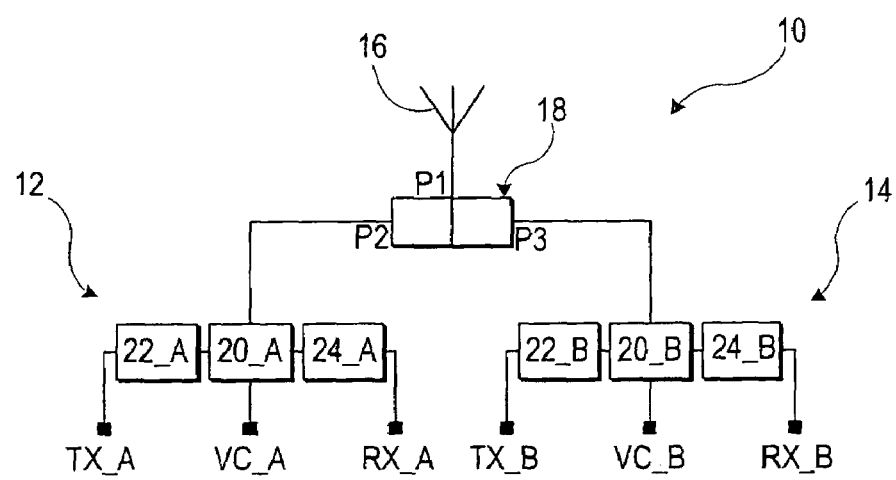
FIG. 2 is a block diagram of a typical multi-band antenna switch module (ASM) including a diplexer.

Referring now to FIG. 2, there is shown generally indicated as 10, a simplified block diagram of part of a dual-band telecommunications device such as may be found in a mobile telecommunications handset. The circuitry shown in FIG. 2 is sometimes referred to as an antenna switch module (ASM), particularly when incorporated into a single module. The ASM 10 is generally similar to that illustrated in FIG. 1, although the TX and RX circuitry is shown in more detail. The ASM 10 includes TX/RX circuitry 12 for a first operational frequency band A and TX/RX circuitry 14 for a second operational frequency band B. The TX/RX circuitry 12, 14 are each electrically coupled to an antenna 16 by a diplexer circuit, or diplexer 18. The diplexer 18 has an antenna port P1 connected to the antenna 16, a second port P2 connected to TX/RX circuitry 12 and a third port P3 connected to TX/RX circuitry 14.

The TX/RX circuitry 12 for band A includes a first port TX_A for receiving signals in frequency band A from signal generating circuitry (not shown) and a second port RX_A for providing signals received at antenna 16 in frequency band A to signal processing circuitry (not shown). A third port VC_A is provided for receiving a control signal, typically in the form of an ON/OFF D.C. voltage, for selecting the setting of a switching device 20_A. Depending on its setting, switching device 20_A selects either to electrically connect TX_A to port P2 of the diplexer 18 (thereby allowing signals in band A to be transmitted via antenna 16 while simultaneously electrically isolating RX_A and associated circuitry from P2) or to electrically connect RX_A to port P2 of the diplexer 18 (thereby allowing signals in band A received at antenna 16 to be providing to the signal processing circuitry, while simultaneously electrically isolating TX_A and associated circuitry from P2).

A first filter 22_A may be provided between the TX_A port and the switching device 20_A for removing harmonics of the signal to be transmitted. A second filter 24_A may be provided between the RX_A port and the switching device 20_A for preventing signals received at TX_A from reaching RX_A. Commonly, filter 24_A is included in switching device 20_A.

TX/RX circuitry 14 is generally similar in structure and operation to TX/RX circuitry 12 and includes a first port TX_B for receiving signals in frequency band B from signal generating circuitry (not shown), a second port RX_B for providing signals received at antenna 16 in frequency band B to signal processing circuitry (not shown) and a third port VC_B for receiving a control signal for selecting the setting of switching device 20_B. A first filter 22_B may be provided between the TX_B port and the switching device 20_B for removing harmonics of the signal to be transmitted and a second filter 24_B may be provided between the RX_B port and the switching device 20_B for preventing signals received at TX_B from reaching RX_B.

As is conventional, signal paths in the ASM 10 are provided by, where appropriate, transmission lines, for example microstrip transmission lines.

The specific structure of the ASM 10, and in particular the TX/RX circuitry 12, 14, is given by way of example only. There are many different conventional architectures for ASMs, or similar devices, which include a diplexer, or similar device, at the antenna. The invention is not limited to use with the specific architecture shown in FIG. 2.

When a conventional diplexer of the general type shown in FIG. 1 is employed as diplexer 18, the ASM 10 suffers from poor out-of-band matching as outlined above.

Figure 3:
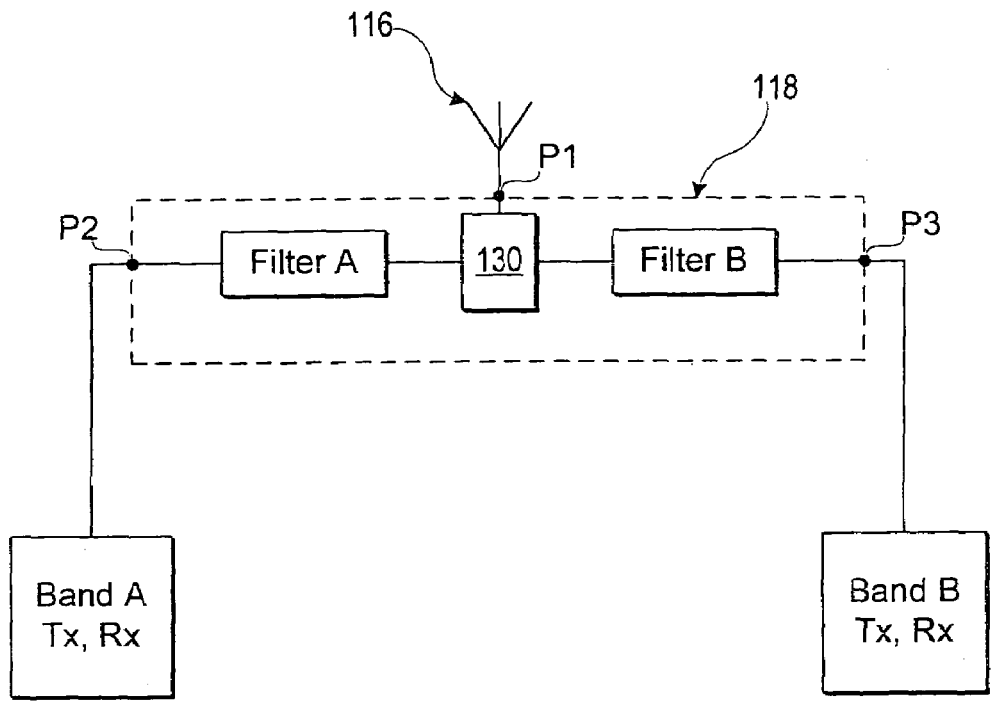
FIG. 3 is a block diagram of an ASM including a signal separation device in the form of a diplexer circuit embodying the present invention.

FIG. 3 shows a block diagram of a signal separating device in the form of a diplexer 118 embodying the present invention. Diplexer 118 is generally similar to the diplexer 8 presented in FIG. 1 but further includes an impedance matching circuit 130 at the antenna port P1. Because of its location at the antenna port P1, the impedance matching circuit 130 may be said to be common to both branches of the diplexer 118. The impedance matching circuit 130 is arranged so that, when signals are received in one or other of the operational frequency bands, the impedance matching circuit matches or tunes out any reactive (i.e. capacitive or inductive) components of the impedance presented to the antenna port P1 by the out-of-band branch. In particular, the impedance matching circuit 130 is arranged so that the impedance, or more particularly the reactance, it presents to the antenna port P1 is substantially the opposite of the reactance presented to the antenna port P1 by the out-of-band diplexer branch, e.g. if the reactance presented to the antenna port P1 by the out-of-band diplexer branch is capacitive, then the reactance the impedance matching circuit presents to the antenna port P1 is correspondingly inductive, and vice versa, so that the combined reactance at P1 is substantially zero. In order to fulfil this task for each operational frequency band, the respective impedances/reactances of the diplexer branches and of the impedance matching circuit 130 must be carefully selected. In the preferred embodiment, the impedance matching circuit comprises an inductor provided between antenna port P1 and electrical ground (earth), as is illustrated in FIG. 4.

Figure 4:
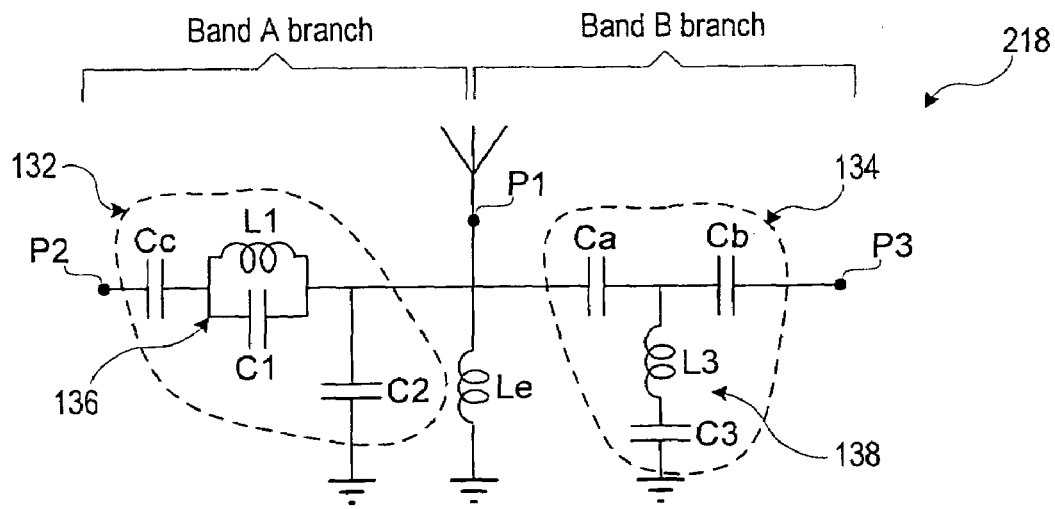
FIG. 4 is a block diagram of a preferred embodiment of the diplexer circuit FIG. 3.

Referring now to FIG. 4, there is shown a diplexer circuit 218 comprising a specific embodiment of the general diplexer architecture 118 shown in FIG. 3. Diplexer 218 comprises an antenna port P1, a second port P2 for connection to the TX/RX circuitry (not shown) of a first operational frequency band (Band A), and a third port P3 for connection to the TX/RX circuitry (not shown) of a second operational frequency band (Band B). The diplexer circuit branch between ports P1 and P2 comprises a filter circuit 132 which allows signals in Band A to pass from antenna port P1 to port P2 while preventing signals in Band B from doing so. This branch is hereinafter referred to as the Band A branch and may be said to be in-band when signals are received in Band A, and out-of-band when signals are received in Band B. The diplexer circuit branch between ports P1 and P3 comprises a filter circuit 134 which allows signals in Band B to pass from antenna port P1 to port P3 while preventing signals in Band A from doing so. This branch is hereinafter referred to as the Band B branch and may be said to be in-band when signals are received in Band B, and out-of-band when signals are received in Band A.

In the following description, it is assumed by way of example only, that operational frequency Band A is centred around approximately 890 MHz (and may therefore be referred to as the low band) and that operational frequency Band B is centred around approximately 1850 MHz (and may therefore be referred to as the high band). These frequency bands are commonly used in cellular telecommunications and are usually referred to as a GSM band and DCS band respectively.

The architecture of filter 132 is of a general notch, or bandstop, type filter and comprises a resonator 136 comprising an inductor L1 and capacitor C1 in parallel with one another and in series with the circuit branch between P1 and P2. The component values for L1 and C1 are selected so that resonator 136 resonates in frequency Band B. Hence, when the Band A branch is out-of-band, resonator 136 presents a substantially open-circuit to signals received at the antenna port P1 in Band B. When the Band A branch is in-band it behaves as a matched through-line and signals in Band A are allowed to pass from P1 to P2. Typically one or more in-band matching components are required so that the Band A branch, when in-band, is matched to the characteristic impedance of the system. This may be achieved by any conventional technique, for example by adding one or more reactive components which transform the in-band impedance of the Band A branch, as presented to P1, to the centre point of a conventional Smith Chart).

Where Band B is centred around 1850 MHz, the following component values may be used: L1=5.5 nH; C1 1.35 pF. This causes the resonator 136 to present an inductive impedance to P1 when in band and so a capacitive in-band matching component in the form of capacitor Cc is required. It is preferred to use a capacitor in series with the diplexer branch in order to provide D.C. decoupling. As can be seen from FIG. 4, series capacitor Cc is preferably provided at port P2. In the present example, a suitable value for Cc is approximately 4.46 pF.

Filter 132 also includes an additional capacitance which, in the present example, comprises a capacitor C2 connected between the Band A branch and electrical ground, i.e. a shunt capacitor. The purpose of capacitor C2 is to adjust the reactance presented to P1 by the Band A branch when out-of-band, as is described in more detail below.

The architecture of filter 134 in the Band B branch is of a general notch, or bandstop, type filter and comprises a resonator 138 comprising an inductor L3 and a capacitor C3 in series with one another and in parallel, or shunt, with the circuit branch between P1 and P3. The component values L3 and C3 selected so that resonator 138 resonates in Band A. Hence, when the Band B branch is out-of-band, resonator 138 acts as a short-circuit to signals in Band A and so prevents such signals from reaching port P3. When Band B branch is in-band it behaves as a matched through-line and signals in Band B are allowed to pass from P1 to P3. As before, one or more in-band matching components are usually required to match the in-band impedance of the Band A branch to the characteristic impedance of the system.

In the present example, where Band A is centred around 890 MHz, suitable component values for resonator 138 are: L3=5.7 nH; C3=5.5 pF. The resulting in-band impedance presented at P1 is inductive and so one or more in-band matching components having a capacitive reactance are required. The required corrective reactance, and hence component values, may conveniently be determined using a conventional Smith Chart. In the present case, a shunt capacitor may be employed, but it is preferred to use at least one capacitor in series with the circuit branch in order to provide D.C. decoupling. In FIG. 4, two series capacitors Ca, Cb are used as in-band matching components, capacitor Ca being located between the resonator 138 and P1, while capacitor Cb is located between the resonator 138 and P3. In the present example, suitable values for each of capacitors Ca and Cb are 1.47 pf or 2.01 pF. Capacitor Ca provides DC decoupling at the antenna port P1 while Cb provides DC decoupling at P3 to block the DC bias (not shown) which may be used for the TX/RX switching diodes.

The out-of-band impedance presented to the antenna port P1 by the Band B diplexer branch of FIG. 4 is capacitive. Hence, when out-of-band, filter 138 behaves as a capacitor connected between P1 and ground rather than behaving as an open-circuit (as is desired). For the circuit shown in FIG. 4, the effective out-of-band impedance presented to P1 by the Band B branch is found to be approximately -j1.792. As a result, the Band B branch causes, when out-of-band, an impedance mismatch at the antenna port P1 and at the output port P2. Hence, while the out-of-band Band B branch provides good attenuation of signals in Band A (thereby preventing such signals from reaching P3) a significant portion of signals in Band A will be reflected back to the antenna port P1 and to the antenna itself. This results in-poor performance in terms of return loss and insertion loss.

In the present example, the configuration of the Band A branch is such that, when out-of-band, it presents a substantially open-circuit to P1, i.e. there is no significant reactive impedance presented to P1. Hence, the Band A branch does not have a significant affect on the in-band performance of the Band B branch. In practice, however, stray capacitance to electrical ground may be present and this may cause the out-of-band Band A branch to present a capacitive reactance at P1.

The role of the impedance matching circuit 130 is to tune out, or cancel, the effect of the out-of-band impedance, and in particular the reactive component of the out-of-band-impedance, presented at the antenna port P1 by one or both of the diplexer branches. In the present example, only the Band B branch presents a reactive out-of-band impedance at P1. Since the reactive component of this out-of-band impedance is capacitive, an inductive matching network 130 is required. In the FIG. 4 embodiment, the matching network 130 comprises an inductor Le connected between the antenna port P1 and electrical ground. However, the presence of inductor Le upsets the otherwise open-circuit out-of-band characteristic of the Band A branch. Hence, the out-of-band impedance of the Band A branch is deliberately made to be reactive (capacitive in the present example) to an extent that will be tuned out by the matching circuit 130 (in this case the inductor Le). The respective out-of-band reactances of the diplexer branches must be carefully selected in order that they may each be tuned out, or cancelled, by a single matching circuit 130. In preferred embodiments, the respective out-of-band reactance of each diplexer branch is arranged so that it may be characterised as a capacitance or an inductance connected between the antenna port P1 and electrical ground.

Consider the case where the out-of band impedance of the diplexer branches may be represented as follows:

$$Z=R+jX \quad [1]$$

Where Z is impedance, R is the resistive component and X is the reactive component. The out-of-band impedances of the Band A and Band B branches, $Z_A$, $Z_B$, are made to be reactive, with a high reflection coefficient and with a carefully selected ratio between the respective reactive components $X_A$, $X_B$. The respective resistive components $R_A$, $R_B$ are very small (typically less than 0.1 normalised value) and are therefore ignored.

In the preferred embodiment where the out-of-band reactances are comprised of shunt capacitances $C_A$, $C_B$ and the matching circuit 130 comprises a shunt inductance Le, when signals are received in band A, Le is selected to resonate with $C_B$, and when signals are received in band B, Le is selected to resonate with $C_A$. At resonance:

$$F_A=1/(2\pi\sqrt{(LeC_B)}) \quad [2]$$

$$F_B=1/(2\pi\sqrt{(LeC_A)}) \quad [3]$$

Where $F_A$ and $F_B$ are frequencies, conveniently mid-band frequencies, representing operational frequency bands A and B respectively.

From [2] and [3] it may be deduced that $$\omega_A Le=1/(C_B\omega_A) \quad [4]$$

$$\omega_B Le=1/(C_A\omega_B) \quad [5]$$

where $\omega$ is the angular frequency, $2\pi F$. It will be seen from [4] that the reactance $X_{Le}$ of the matching circuit 130 in frequency band A is the opposite of the reactance $X_{CB}$ of the out-of-band branch B. Similarly from [5], the reactance $X_{Le}$ of the matching circuit 130 in frequency band B is the opposite of the reactance $X_{CA}$ of the out-of-band branch A.

Hence, the reactances $X_A$, $X_B$ and the reactance of the matching circuit 130 are chosen so that the following criteria are met: when receiving signals in Band A, the reactance of the matching circuit 130 is substantially the opposite of the reactance presented to the antenna port P1 by the Band B diplexer branch; and, when receiving signals in Band B, the reactance of the matching circuit 130 is substantially the opposite of the reactance presented to the antenna port P1 by the Band A diplexer branch.

In the case where the Band A and Band B diplexer branches each present an respective out-of-band capacitive reactance $C_A$, $C_B$ between P1 and ground, the above criteria, are satisfied when:

$$C_B/C_A=(F_A/F_B)^2 \quad [6]$$

The arrangement is such that the inductor Le resonates, in each operational frequency band A and B, together with the effective capacitance presented to the antenna port P1 by the out-of-band branch. When resonating, the combination of the inductor Le and out-of-band branch present a very high impedance (substantially open-circuit) at the antenna port P1. As a result, the performance of the in-band branch is not affected by the out-of-band branch since the impedance mismatch caused by the reactive out-of-band branch has been tuned out by the addition of the inductor Le.

In a typical design process for the architecture of FIG. 4, the value of C2 has an effect on both $C_A$ and $C_B$ and so a value for C2 is chosen so that equation [2] is satisfied. Then, the resulting values of $C_A$ and/or $C_B$ may be substituted into equation [2] or [3] to determine a value for Le. In the foregoing example where Band A is centred around 890 MHz and Band B is centred around 1850 MHz, C2 may take the value 0.6 pF and Le may be 12.25 nH.

The foregoing descriptions in relation to equations [1] to [6] relates particularly to the FIG. 4 embodiment where the inductor Le forms a band pass filter, or parallel LC resonator, when combined with one or other of the respective out-of-band capacitances $C_A$, $C_B$. A skilled person will understand that these equations may be modified when alternative architectures are used.

In the embodiment shown in FIG. 4, in-band impedance matching is performed for each branch of the diplexer. Hence, the role of the matching circuit 130 is to tune out reactances presented at the antenna port P1 by the out-of-band branch (since the properly matched in-band branch does not present such unwanted reactances to the antenna port P1). Because the Band A branch, when out-of-band, does not initially present any reactance at P1, the shunt capacitor C2 is added in order to cancel out the effect of the inductor Le in frequency Band B by resonating therewith, as described above. In an alternative embodiment, however it is not necessary to add capacitor C2 for this purpose. Rather, the in-band impedance of the Band B branch of the diplexer is deliberately mismatched so that an impedance with a reactive component is presented at the antenna port P1 in Band B. It is this in-band reactance (capacitance in the present example) which resonates with the inductor Le in Band B. As before, provided the ratio of the out-of-band reactance to the in-band reactance of-the Band B branch is carefully selected, the overall circuit will be properly matched in both frequency bands A and B. For example, with reference to FIG. 4, with C2 removed, the values of Ca and Cb are adjusted so that the Band B branch behaves, when in-band, as a capacitance between P1 and ground. As before, the Band B branch also behaves as a shunt capacitance when out-of-band. Both of these capacitances may be tuned out by the inductor Le provided the following condition is met:

$$Im(Y_B)/Im(Y_A)=F_A/F_B \quad [7]$$

Where $Im(Y_B)$ and $Im(Y_A)$ are the imaginary components of the respective admittances $Y_B$, $Y_A$ presented to P1 by the Band B branch when in-band and when out-of-band respectively.

Hence, the matching circuit 130 (which in the present example comprises inductor Le) resonates in each operational frequency band with the respective reactive impedance at the antenna port P1, irrespective of whether said reactive impedance arises from the out-of-band branch or the in-band branch. As a result, the overall circuit is properly matched at each operating frequency and its performance is not impaired by out-of-band (or in-band) impedance mismatching.

In the preferred embodiments where each branch is arranged to present an out-of-band reactance to the antenna port P1, each out-of-band reactance is present between the antenna port P1 and ground (i.e. a shunt reactance). In such embodiments, it is preferred to use an appropriately selected shunt reactance, e.g. inductor Le, at the antenna port P1 to tune out the out-of-band reactance (thereby creating a parallel LC resonator between the antenna port P1 and ground). Such an arrangement simplifies the design process.

However, it is possible to provide a series reactance, e.g. series inductance or capacitance, at the antenna port P1 to tune out the out-of-band reactances. In alternative embodiments where there is an in-band impedance mismatch as described above, the effective mismatched in-band reactance may be present either in series with the antenna port P1 or between P1 and ground (i.e. shunt). If it is in series, then it is preferred to tune it out using an appropriately selected series reactance. If it is in shunt, then it is preferred to tune it out using an appropriately selected shunt reactance, e.g. inductor Le.

In the foregoing embodiments, the matching network 130 is inductive and the effective reactance presented at P1 by the in-band or out-of-band branches is capacitive. However, in alternative embodiments (not illustrated) the diplexer may be constructed so that the matching network is capacitive (e.g. comprised of a capacitor connected between the antenna port P1 and ground) and the effective reactance presented at P1 by the in-band or out-of-band branches is inductive.

The invention is not limited to the specific filter architectures 132, 136 shown in FIG. 4. Other filter architectures, including conventional low pass, high pass or band pass filter architectures, for example, Chebychev or Butterworth architectures, may be used in either or both branches of the diplexer. As is well known, such architectures can readily be designed to present capacitive or inductive reactances to the antenna port P1, as required. It is preferred, however, to use architectures which provide a series capacitor at the output ports P2 and P3, and preferably also at the antenna port P1 to provide DC decoupling.

The invention is not limited to use with diplexers and may equally be used with multi-branch signal separators (sometimes referred to as multiplexers) in which three or more circuit branches emanate from the antenna port P1. In such a multiplexer, the impedance matching circuit 130 may still be comprised of a single component, for example a shunt inductor at the antenna port.

Depending on the requirements of the application, the impedance matching network may comprise any suitable combination of circuit components. It is preferred however to design the diplexer/multiplexer circuit in such a way that the matching circuit 130 comprises a single component in order to keep space requirements to a minimum.

Moreover, it is particularly preferred to provide an inductor connected between the antenna port and electrical ground since this has the added advantage of providing the diplexer/multiplexer (and the device of which it is part) with Electrostatic Discharge (ESD) protection since it provides a path to ground for low frequency (including D.C.) signals at the antenna port P1. Of course, two or more shunt inductors may be provided at the antenna port P1 to improve ESD protection while still providing the impedance matching function described above. However, for reasons of space conservation, a single inductor is preferred.

For the purposes of ESD protection, it is preferred that the inductor between the antenna port P1 and ground is provided by a physical inductor (for example a Low Temperature Co-fired Ceramic (LTCC) coil) formed with relatively thick lines and preferably small turns. This helps to reduce the inherent series resistance of the inductor. It is also preferred to position the inductor as far as possible from the other components of the diplexer/multiplexer to prevent capacitive coupling from degrading ESD performance.

The invention is not limited to the embodiments described herein which may be modified or varied without departing from the scope of the invention.

The invention claimed is:

1. A signal separating device comprising:
   a first and a second circuit branch connected to an antenna port, the first circuit branch comprising a filter for passing signals in a first frequency band, and the second circuit branch comprising a filter for passing signals in a second frequency band,
   wherein, in the second frequency band, the first circuit branch provides a first capacitive impedance between the antenna port and electrical ground, and
   in the first frequency band, the second circuit branch provides a second capacitive impedance between the antenna port and electrical ground, and
   wherein the device further comprises an impedance matching circuit provided at the antenna port and provides, in the second frequency band, a first inductive impedance between the antenna port and ground which substantially cancels out the first capacitive impedance, and provides, in the first frequency band, a second inductive impedance between the antenna port and ground which substantially cancels out the second capacitive impedance.

2. A signal separating device as claimed in claim 1, wherein said impedance matching circuit comprises an inductor connected between the antenna port and electrical ground.

3. A signal separating device as claimed in claim 2, wherein, when signals are received at the antenna port in said first frequency band, said inductor and the second capacitive impedance resonate together, and, when signals are received at the antenna port in said second frequency band, said inductor and the first capacitive impedance resonate together.

4. A signal separating device as claimed in claim 3, wherein the ratio of the second capacitive impedance to the first capacitive impedance is substantially equal to a square of a ratio of said first frequency band to said second frequency band.

5. A signal separating device as claimed in claim 1 wherein said first and second circuit branches are provided between said antenna port and a second and third port respectively, and wherein a respective series capacitor is provided at each of said second and third ports.

6. A signal separating device as claimed in claim 1, wherein at least one circuit branch includes a series capacitor at the antenna port.

7. An antenna switch module comprising:
   a first transmit/receive (TX/RX) circuitry operable in a first frequency band;
   a second TX/RX circuitry operable in a second frequency band;
   a diplexer circuit having an antenna port connected to an antenna, a second port connected to the first TX/RX circuitry, and a third port connected to the second TX/RX circuitry, wherein the diplexer couples the first and the second TX/RX circuitry to the antenna, the diplexer circuit comprising:

a signal separating device comprising:
  a first circuit branch connected between the antenna part and the first transmit/receive TX/RX circuitry;
  a second circuit branch connected between the antenna port and the first transmit/receive TX/RX circuitry; and
  an impedance matching circuit provided at the antenna port;
  the first circuit branch comprising a first filter for passing signals in the first frequency band;
  the second circuit branch comprising a second filter for passing signals in the second frequency band,
  wherein, in the second frequency band, the first circuit branch provides a first capacitive impedance between the antenna port and electrical ground, and
  wherein, in the first frequency band, the second circuit branch provides a second capacitive impedance between the antenna port and electrical ground, and
  wherein the impedance matching circuit provides, in the second frequency band, a first inductive impedance between the antenna port and electrical ground and substantially cancels out the first capacitive impedance, and
  wherein the impedance matching circuit provides, in the first frequency band, a second inductive impedance between the antenna port and ground to substantially cancels out the second capacitive impedance.

8. The antenna switch module of claim 7, wherein a respective series capacitor is provided at each of said second and third ports.

9. The antenna switch module of claim 7, wherein at least one of the first TX/RX circuitry and the second TX/RX circuitry includes a series capacitor at the antenna port.

* * * * *